United States Patent [19]
Tavernier et al.

[11] Patent Number: 6,146,799
[45] Date of Patent: Nov. 14, 2000

[54] METHOD FOR PRINTING CONTINUOUS TONE IMAGES WITH HIGH DENSITY RESOLUTION

[75] Inventors: Serge Tavernier, Lint; Dirk Broddin, Edegem; Paul Märksch, Hove, all of Belgium

[73] Assignee: Agfa-Gevaert, Mortsel, Belgium

[21] Appl. No.: 09/306,319

[22] Filed: May 6, 1999

Related U.S. Application Data

[60] Provisional application No. 60/096,564, Aug. 14, 1998.

[30] Foreign Application Priority Data

Jun. 17, 1998 [EP] European Pat. Off. ............. 98202040

[51] Int. Cl.$^7$ .................................................. G03G 13/22
[52] U.S. Cl. ............................ 430/54; 358/300; 346/74.7
[58] Field of Search ...................... 430/49, 54; 346/74.7; 358/300; 101/DIG. 37

[56] References Cited

U.S. PATENT DOCUMENTS

| | | | |
|---|---|---|---|
| 3,689,935 | 9/1972 | Pressman et al. | 346/74 ES |
| 4,600,675 | 7/1986 | Iwasa et al. | 430/106.6 |
| 4,860,026 | 8/1989 | Matsumoto et al. | 346/1.1 |
| 4,862,289 | 8/1989 | Shimada | 358/298 |
| 5,142,337 | 8/1992 | Karidis et al. | 355/266 |
| 5,740,279 | 4/1998 | Wang et al. | 382/237 |

FOREIGN PATENT DOCUMENTS

| | | |
|---|---|---|
| 569744 | 11/1993 | European Pat. Off. . |
| 606022 | 12/1993 | European Pat. Off. . |
| 768577 | 10/1995 | European Pat. Off. . |
| WO8403189 | 8/1984 | WIPO . |

OTHER PUBLICATIONS

Abstract of JP 58/162970.

*Primary Examiner*—John Goodrow
*Attorney, Agent, or Firm*—Baker Botts L.L.P.

[57] ABSTRACT

A method and device for printing a reproduction of an image by using toner particles, in which digital image data of at least two density separations of the image is obtained for forming at least two sub-images. The image data of a first sub-image of the sub-images is provided to a printing station containing toner particles with a particular chromaticity and a particular optical density. Then, the first toner particles are applied in an image-wise manner on an image receiving member for forming a first toner image in correspondence with the image data. Thereafter, on the same printing station and using second toner particles having a chromaticity substantially equal to the particular chromaticity and an optical density substantially equal to the particular optical density, the image data is again provided and the toner particles are again applied for bringing at least one second toner image, corresponding to a second sub-image, on the image receiving member in register with the first toner image.

22 Claims, No Drawings

METHOD FOR PRINTING CONTINUOUS TONE IMAGES WITH HIGH DENSITY RESOLUTION

The application claims the benefit of U.S. Provisional Application No. 60/096,564 filed Aug. 14, 1998.

FIELD OF THE INVENTION

The invention relates a method for reproducing images. In particular, but not exclusively it relates to electrostatographic methods for printing reproductions of continuous tone images. The printing proceeds on opaque reflecting supports as well as on transparent supports.

BACKGROUND OF THE INVENTION

Well accepted printing methods in an "office-environment" as e.g. ink-jet printing and electrostatographic methods, are not used as much as would be expected when the convenience of these methods is considered. Most of these printing methods can only partially print continuous tone images and the continuous tone image has to be specially treated (e.g. by a dither method) before the print can be made. In this context, a continuous tone image or contone image is an image containing grey levels, with no perceptible quantisation to them. This drawback has hampered the use of these very convenient printing methods in those imaging areas where it is important to accurately print continuous tone images as e.g. in pictorial photography, medical imagery, etc.

In ink-jet printing, a convenient printing system for use in an office environment, it has been proposed in EP-A-606 022 to use different inks, with different pigmentation and to use the ink with low pigmentation to print the low densities and the ink with high pigmentation to print the high densities. In this technique use is made of ink drops with volumes ranging from 25 to 100 $\mu$l in the so called bubble jet based systems, or with volumes in the range of 5 to 10 $\mu$l in the so called continuous jet systems. In all cases the images are built up by combining in an appropriate way such drops on the substrate, and although the addressability of each drop typically lies in the range of 300 dpi (dots per inch, or dots per 25.4 mm) to 1200 dpi, the not fully reproducible way the dot spreads and penetrates in the substrate limits the real resolution in the printed image. Hereinafter the resolution of image will be described in dpi, a normal description in the printing business. 1 dpi (one dot per inch) equals 1 dot per 25.4 mm. Further attempts to reproduce continuous tone images using light- and dark-coloured inks have been described in EP-A-606 022 and U.S. Pat. No. 4,860,026.

Electro(stato)graphic methods are evenly well accepted imaging methods in an "office environment" as ink-jet printing since these methods, e.g. electrophotographic copiers, electrographic printers, Direct Electrostatic Printing (DEP), are convenient, fast, clean and do not need liquid solutions or dispersions. Since electro(stato)graphic methods may use solid particles that typically have a particle diameter between 1 and 10 $\mu$m as marking particle, it is possible to achieve very high resolution in electro(stato)graphy.

However, most electro(stato)graphical imaging systems, are not intrinsically capable of forming continuous tone and special measures have to be taken to print continuous tone images.

Continuous tone printing in electrophotographic printing by a laser beam is described in the Journal of Imaging Technol., Volume 12, n° Dec. 6, 1986 on pages 329 to 333 in an article entitled "Electrophotographic colour Printing Using Elliptical Laser Beam Scanning Method". In this article a dot matrix method, combined with pulse-width modulation of the laser beam (to be able to introduce in each dot of the matrix several density levels) and with an elliptical laser beam, is described to achieve a continuous tone reproduction with sufficient resolution and linearity over a tone range of 256 levels. Although with such a printing system quality continuous tone prints can be made, there are still some problems to be addressed. On an electrostatic photoreceptor there is a threshold level of toner adhesion: this means that in the low density areas, where the electrostatic latent image is weak and is situated just above that threshold, the system shows inherently some instability in the low density areas. Also, since the low density areas are printed using very few toner particles, the granularity (in other terms graininess or noise) in the low density areas becomes easily objectionable for high quality prints.

In Patent Abstract of Japan vol. 007 no. 290 (p. 245), Dec. 24, 1983 & JP-A-58/162970 (Hitachi Seisakusho KK), Sep. 27, 1983 a second toner having a same colour and a lower colour density (1.0 black density) is added in a single development station to a first toner (1.8 black density), already present in said single development station, in a 4:1 ratio to obtain a good gradation. The gain in density resolution of the printed image (i.e. having a continuous tone image) is rather limited.

In U.S. Pat. No. 5,142,337 a second toner is used, comprising a mixture of opaque black, opaque white and clear toner. A second toner layer is applied on top of a first toner layer, comprising black toner. In this method also, although image quality is high and very even images can be produced, the gain in density resolution of the printed image (i.e. having a continuous tone image) is rather limited.

In proceedings of the International Congress on Advances in Non-Impact Printing Technologies, San Diego, Nov. 12–17, 1985, no. Congress 5, Nov. 12, 1989, Moore J., pages 331–341, Kunio Yamada et al 'Improvement of halftone dot reproducibility in laser-xerography', the author discusses graininess of the xerographic process, mainly influenced by dot growth.

A method for printing a continuous tone image with electro(stato)graphic printing methods has been described in EP-A-768 577. In this method comprising the steps of partitioning a surface of said substrate into a plurality of disjunctive microdots and applying to at least one microdot at least two types of toner, having substantially the same chromaticity, the intrinsic qualities of electro(stato)graphic printing methods (speed, resolution, cleanness, dry operationable) can be used to print continuous toner images. In that disclosure, the stable printing of high resolution half-tone (continuous tone) images over at least 256 printed (not only addressed) density levels is shown.

The method of that disclosure necessitates the use of different types of toner particles and thus the use of apparatus with different toner stations containing toner particles with the same chromaticity, but having different amounts of colorant. Thus there are several printing stations necessary even for printing monochrome images.

This limits the usefulness of the method of EP-A-768 577 more or less to the use of larger electrostatographic printers. There is thus still a need for a method for stable printing of high resolution half-tone (continuous tone) reproductions of continuous toner images over at least 128 printed (not only addressed) density levels in simple and smaller printers

OBJECTS AND SUMMARY OF THE INVENTION

It is an object of the invention to provide a method for printing reproductions of continuous tone images in a desktop printer using only one type of toner particles for a given chromaticity.

It is a further object of the invention to provide a method for printing full-colour images with low contrast and high density resolution.

Other objects and advantages of the present invention will become clear from the detailed description hereinafter.

The object of this invention is realised by providing a method for printing a reproduction of a continuous tone image by using toner particles, comprising the steps of:

a) creating at least two sub-images, b) feeding image data of one of said sub-images to a printing station containing toner particles with a first chromaticity and a first optical density, c) image-wise applying said toner particles on an image receiving member for forming a first toner image in correspondence with said image data and d) repeating, with toner particles having a chromaticity substantially equal to said first chromaticity and an optical density substantially equal to said first optical density steps b) and c) at least once more for bringing at least one further toner image, corresponding to a further sub-image, on said image receiving member in register with said first toner image.

In a preferred embodiment the method is an electrostatographic method and the toner particles are dry toner particles comprising a toner resin and a colorant.

DEFINITIONS

The wording "image or reproduction with high density resolution" is throughout this text used for indicating a high resolution half-tone (continuous tone) image with at least 128 printed (not only addressed) density levels.

The wording "monochrome image" has in this document to be understood as "an image made in a single colour", it can be black and white but it can also be any other combination of a single colour and white, e.g. an image in cyan and white is a monochrome image. An image in a single hue on a coloured background, e.g. an image in black on a blue transparent base is also a monochrome image. Also a colour separation of a full-colour image is considered in this text as a monochrome image.

The wording "density separation of an image" is in this document used to indicate a sub-image containing a range of density levels that is less than the total range of optical density levels in the image. After printing all density separations, a "full-density". image is obtained. This is analogous with the well known colour separations of a colour image.

The wording "image" is used to describe pictures, text, drawings, graphs, etc.

The wording "image receiving member" is used in this text to indicate a receiver whereon at least two sub-images, made with toner particles having the same chromaticity and same optical density are received in register with each other. Depending on the concept of the printer used to implement the method of this invention, the "image receiving member" is the final substrate, an intermediate image receiving member from where the image is transferred to the final substrate, or a photoconductive member from where the image is transferred either to the final substrate or to an intermediate member.

The wording "substantially equal chromaticity" or "substantially the same chromaticity" means that, as expressed in the approximately uniform CIE L*a*b* color space, the following holds:

$$\sqrt{(\Delta a^*)^2 + (\Delta b^*)^2} \leq 20$$

wherein $\Delta a$ and $\Delta b$ are the difference in hue and saturation respectively. Chromaticity describes objectively hue and saturation of a color, and may be measured in terms of CIE x,y or u',v' (cfr. "The reproduction of color in photography, printing & television" by R. W. G. Hunt, 4th edition 1987, ISBN 0 86343 088 0, pp. 71–72).

The wording "optical density of toner particles" is in this document used to indicate the optical reflection density of an even patch made by depositing a given amount of said toner particles on a reflective substrate and fixing it.

The wording "substantially equal optical density" or "substantially the same optical density" means that for a given amount of toner deposited and fixed on a reflective surface the optical reflection density of the various toners differ less than 0.10 D.

DETAILED DESCRIPTION OF THE INVENTION

The essence of the method of the invention lays in the finding that by dividing an image in at least two sub-images and by printing these sub-images in register using toner particles with substantially the same chromaticity and substantially the same optical density for each sub-image, small printers could be used for printing reproductions of continuous toner images wherein the reproduction had a high density resolution. This showed to be an improvement over the method presented in EP-A-768 577 wherein several type of toner particles were necessary and wherein the printing proceeded in printers having two or more printing stations.

Basically the method of the invention comprises the steps of defining several sub-images, printing one of the sub-images with toner particles with a first chromaticity and a first optical density, and then repeating once more the printing with a different or the same sub-image, but in any case with toner particles with a chromaticity equal to the first chromaticity and an optical density equal to the first optical density.

I.e. in the method according to this invention at least two of the sub-images making up the final image are printed with toner particles having substantially the same chromaticity and the substantially the same optical density.

Thus the method according to this invention is a multi-pass printing method that differs from the multi-pass methods for printing colour images in that at least in two passes toner particles with substantially the same chromaticity and substantially the same optical density are used. Preferably the toner particles for printing the sub-images are provided from a single printing station, so that very small printers can be used;

It is preferred in the method according to this invention to have the original continuous tone image available in form of digital image data. The digital image data can be directly available such as image date from a digital still camera, from a medical CT-scan, images obtained in the field of non-destructive testing, images obtained from digital projection radiography, etc.. Both medical images (images of a part of the human body) as images from the field of non-destructive testing ( images of part of an object) are termed "diagnostic images". The digital image data can also be obtained indirectly by scanning and digitising the analogue continues tone image. On the basis of the digital image data (the electronic original image) the image data corresponding to the sub--images (i.e. the density separations) are produced electronically.

The method according to this invention, for printing a reproduction of continuous tone images the method proceeds basically as follows:

a) if the continuous tone original is not directly available as an electronic image, it is converted to an electronic image, b) at least two density separations of an image are electronically created, forming at least two sub-images, b) image data corresponding to a first sub-image (a first density separation) are fed to a printing station containing toner particles with a first chromaticity and a first optical density, c) a toner image corresponding to said image-data is brought on to an image receiving member, d) image data corresponding to a further sub-image (a further density separation) are fed to a printing station wherein toner particles, with substantially the same chromaticity and substantially the same optical density as the toner particles used in step a) are present, and e) a toner image corresponding to said image-data of said further sub-image is brought on to said same image receiving member in register with toner images already present on said image receiving member.

The steps d) and e) are repeated until all sub-images are printed.

It was found that printing of reproductions of continuous tone images could be achieved in small printers when the toner particles used for printing contained a low degree of pigmentation. Dry toner particles with low pigmentation are, for sake of this invention, toner particles having such a degree of pigmentation that the optical reflection density of an even patch of fixed toner particles on a reflecting substrate is between 0.1 and 1.00 when 0.5 mg/cm$^2$ of toner particles are deposited. Preferably the toner particles for use in the method according to this invention have a pigmentation so that the optical reflection density of an even patch of fixed toner particles on a reflecting substrate is between 0.2 and 0.80 when 0.5 mg/cm$^2$ of toner particles are deposited.

In the method the image to be printed is divided in sub-images according to different optical density levels. When the method is used for printing monochrome images, only density separations are made, when the method is used for colour printing then several density separations for one or all colour separations are used.

The method can, e.g., for a monochrome image, proceed as follows:

in a first pass image data of the density separation with the lowest optical density are provided to the printing station and are printed with the toner particles with low pigmentation, in a second pass image data of a density separation with higher optical density are provided to the printing station and are printed in register, with the same marking material, and so on until all density separations are printed.

It is clear that in the method of this invention, although a preferred way to proceed is printing the sub-images (i.e. the density separations) in ascending order of densities, the printing order of the different density separations can be freely be chosen, the printing can even proceed in random order.

The effect is that in the lowest density areas of the image a single layer of marking material is present, while in the higher optical density areas two or more layers of marking material are present on top of each other.

The method can also be used to print full colour images with high density resolution. In that case the method can, e.g., be implemented as follows:

In a first cycle image data corresponding to a density separation with low optical density of the yellow colour separation, to a density separation with low optical density of the magenta colour separation, to a density separation with low optical density of the cyan colour separation, and to a density separation with low optical density of the black colour separation are provided in the printing stations and are printed in register on an image receiving member. In a second cycle image data corresponding to a density separation with higher optical density of the yellow colour separation, to a density separation with higher optical density of the magenta colour separation, to a density separation with higher optical density of the cyan colour separation and to a density separation with higher optical density of the black colour separation, are provided to the printing stations and are printed on said image receiving member in register with each other and with the first optical density separation of the four colour separations. The steps are repeated until all density separations are printed.

It is, in a method according to this invention, also possible to print first all yellow density separations in register on the image receiving member, followed by the magenta density separations, the cyan density separation and the black density separations. Basically the order in which density separations are printed in a method of this invention can be chosen with respect to the type of printer used to implement the method, without deviating from the invention, since in any case at least two monochrome density separations are printed in register on an image receiving member using toner particles with the same chromaticity and the same optical density.

The method of this invention can be implemented with several kinds of non-impact printing technologies. They can be used with ink-jet printing when the ink that is used contains a low amount of colorant (dyes and/or pigment). It is however preferred to implement the methods of this invention in printers based on magnetographic or electrostatographic methods using either liquid toners or dry toner particles.

The method according to this invention for printing continuous tone images is well suited for being implemented in magnetography, since in that technique the printing of continuous tone images is not simple, as the technique itself does not allow for printing images with high density resolution.

In the most preferred embodiment of this invention, the method of this invention, is implemented in electrostatographic printers using dry toner particles as marking material.

A great advantage of the method for printing a reproduction of a continuous tone images, according to this invention over the prior art methods is the fact that when printing monochrome images with high density resolution there is only one type of toner necessary instead of several. This simplifies the stock keeping at the users place and avoids the possibility of erroneously mixing up the toner types when refilling the different containers. Moreover the method can be implemented for printing monochrome images with high density resolution in printers having a single printing station with a single container for toner, thus in small table top printers.

Electrostatographic printers for implementing the methods according to this invention, can be printers using the steps of:

i) forming of an electrostatic latent image on an electrostatic latent image bearing member (e.g. by ionography or image-wise removing charges from a uniformly charged photoconductive member, as in classical electrophotography), ii) developing said latent image forming a toner image on said latent image bearing member and iii) transferring said toner image to an image receiving member.

Other electrostatographic printers useful for implementing the methods according to this invention are printers based on the principle of direct electrostatic printing (DEP). In such printers a flow of charged toner particles is created in an electric field from a toner reservoir to the substrate to be printed. In the flow of toner particles a printhead structure with printing apertures equipped for image-wise modulating said flow of toner particles is interposed and the toner image is formed directly on the final substrate ( or if so wished first on an intermediate member, from where it is transferred to the final substrate), without the intervention of an electrostatic latent image. DEP printers have been disclosed in, e.g., U.S. Pat. No. 3,689,935; GB-A-2,108,432, U.S. Pat. No. 5,202,704, EP-A-812 696, EP-A-763 785 and EP-A-816 944. A DEP printer wherein the image is first deposited on an intermediate member and then transferred to the final substrate has, e.g., been disclosed in EP-A-743 572.

When using an electrophotographic printer for implementing the methods according to this invention, several embodiments are useful.

In a first embodiment of a printer useful for implementing the methods according to this invention, the printing station comprises a photoconductive member whereon an electrostatic latent image is formed, e.g., by laser exposure, in accordance to image data and comprises means for supplying charged toner particles to that latent image. This means for supplying charged toner particles can contain a container for developer and a magnetic brush with mono-component magnetic toner particles, or a magnetic brush with a multi component developer comprising magnetic carrier particles and non-magnetic toner particles. The means for supplying charged toner particles to the latent image can also be a container with non-magnetic mono-component developer. Each sub-image is formed and developed on the photoconductive member and from there transferred to the final substrate. Then the photoconductive member is cleaned and a new latent image, corresponding to a further sub-image is developed on the photoconductive member and from there transferred to the final substrate. In this case the different sub-images are formed one after one on the photoconductive drum and one after one transferred to the final substrate which passes back and forth or is rotated on a drum in the vicinity of the photoconductive member. In this embodiment the "image receiving member" is the final substrate.

An example of a small electrophotographic printer that can be adapted for the implementation of the method of this invention is disclosed in EP-A-569 744. The printer disclosed in that document is a multi-pass colour printer.

In a first pass, a latent image corresponding to, e.g., a yellow colour separation is formed on a photoconductive drum, developed with yellow toner, the substrate is positioned near the drum and the yellow toner image is transferred to the substrate from said drum. The substrate is then removed from the vicinity of the drum. In a second pass, a latent image corresponding to, e.g., a magenta image separation is formed on the drum, developed with magenta toner, the substrate is again positioned near the drum for transferring the magenta toner image in register with the yellow image, the substrate is removed again from the vicinity of the drum. In a third and fourth pass the cyan and black image separations are so transferred to the substrate in register with the earlier deposited image separation, thus forming a full colour image.

When in this printer, instead of filling the four toner containers each containing a toner with a specific colour, the four toner containers are filled with the same toner (same chromaticity and optical density) with low pigmentation, the printer can without much modification be used for implementing the method according to this invention when printing monochrome images.

Also the printer sold by SHARP KK of Japan under trade name JX-8200 is very suitable for the implementation of the first embodiment of this invention. Also in this printer, the different sub-images are formed one after one on the photoconductive drum and one after one transferred to the final substrate In a further embodiment of a printer useful for implementing the methods according to this invention, the printing station comprises a photoconductive member whereon an electrostatic latent image is formed, e.g., by laser exposure, in accordance to image data and comprises means for supplying charged toner particles to that latent image. This means for supplying charged toner particles can contain a container for developer and a magnetic brush with mono-component magnetic toner particles, or a magnetic brush with a multi component developer comprising magnetic carrier particles and non-magnetic toner particles. The means for supplying charged toner particles to the latent image can also be a container with non-magnetic mono-component developer. Each sub-image is formed and developed on the photoconductive member and from there transferred to an intermediate image receiving member. Then the photoconductive member is cleaned and a new latent image, corresponding to a further sub-image is developed on the photoconductive member and from there transferred to said intermediate image receiving member. In this case the different sub-images are formed one after one on the photoconductive drum and one after one transferred, in register, to an intermediate image receiving member which passes in the vicinity of the photoconductive member. Once all sub-images are collected on the intermediate image receiving member, the totality of the sub-images is transferred to the final substrate. In this case the intermediate image receiving member is the "image receiving member".

In still a further embodiment for implementing the methods according to this invention in an electrophotographic printer, a plurality of sub-images (even all sub-images) are developed on the photoconductive member on top of each other and the sub-images brought in register on the photoconductive member are then transferred either directly to the final substrate or first to an intermediate image receiving member and from there to the final substrate. In this case the photoconductive drum is "the image receiving member" This implementation has the advantage that the printer works faster than a printer wherein the "image receiving member" is either the final substrate or an intermediate member.

Printers useful for implementing the methods according to this invention while printing full-colour images with high density resolution are e.g. electrophotographic printers wherein normally the four colour separations (Yellow, Magenta, Cyan and Black) are brought in register on the photoconductive drum and then together transferred to the substrate. Such printers have been described in e.g. EP-A-143 535, EP-A-625 731 and U.S. Pat. No. 5,418,097.

The containers for toner are filled, instead of with Y,M,C,K toners giving full density, with Y, M, C and K toners having a lower pigmentation as described herein above. In a first pass density separations with low optical density of the Y,M,C,K image separations Are in register brought on the photoconductive drum and then transferred to the substrate. The substrate is removed from the vicinity of the drum and in a second pass further density separation with higher optical density of the Y, M, C, K image separations are in register brought on the photoconductive drum, the substrate brought again to the vicinity of the drum and the four colour separations with higher density are then transferred to the substrate. The cycle is repeated as long as necessary to print all density separations. When printing full-colour images with high density resolution with a method according to this invention, it also possible in a first cycle to take the first monochrome image, e.g. the yellow colour separation, to generate density separations of the yellow colour separation and print all yellow density separations; then, in a second cycle, to take the second monochrome image, e.g. the magenta colour separation, to generate density separations of the magenta colour separation and print all magenta density separations; then, in a third cycle, to take the third monochrome image, e.g. the cyan colour separation, to generate density separations of the cyan colour separation and print all cyan density separations and to take the fourth monochrome image, e.g. the black colour separation, to generate density separations of the black colour separation and print black density separations. The sequence of printing the different colours and or the different density separations can freely be chosen, without departing from the method according to this invention.

The same possibility, of printing full colour images with high resolution, exist when implementing the methods of this invention in a DEP device wherein the density separations of each of the colour separations are printed on an intermediate member and then transferred to a final substrate. Such a method can beneficially be implemented in a DEP device as disclosed in EP-A-743 572.

It is clear that the method according to this invention can be combined with other means for printing images with high density resolution by using toner particles. E.g. screening, dithering techniques, etc. can be combined with the method of this invention.

The toner particles for use in both method for printing a continuous tone image on an opaque reflecting substrate as well as on a transparent substrate according to the present invention, can essentially be of any nature as well with respect to their composition, shape, size, and preparation method and the sign of their tribo-electrically acquired charge.

The toner particles used in accordance with the present invention may comprise any conventional resin binder.

The binder resins used for producing toner particles according to the present invention may be addition polymers e.g. polystyrene or homologues, styrene/acrylic copolymers, styrene/methacrylate copolymers, styrene/acrylate/acrylonitrile copolymers or mixtures thereof. Addition polymers suitable for the use as a binder resin in the production of toner particles according to the present invention are disclosed e.g. in BE 61.855/70, DE 2,352,604, DE 2,506, 086, U.S. Pat. No. 3,740,334.

Also polycondensation polymers may be used in the production of toner particles according to the present invention. Polyesters prepared by reacting organic carboxylic acids (di- or tricarboxylic acids) with polyols (di- or triol) are the most preferred polycondensation polymers. The carboxylic acid may be e.g. maleic acid, fumaric acid, phthalic acid, isophthalic acid, terephthalic acid, trimellitic acid, etc or mixtures thereof. The polyol component may be ethyleneglycol, diethylene glycol, polyethylene glycol, a bisphenol such as 2,2-bis(4-hydroxyphenyl)-propane called "bisphenol A" or an alkoxylated bisphenol, a trihydroxy alcohol, etc, or mixtures thereof. Polyesters, suitable for use in the preparation of toner particles according to the present invention are disclosed in e.g. U.S. Pat. No. 3,590,000, U.S. Pat. No. 3,681,106, U.S. Pat. No. 4,525,445, U.S. Pat. No. 4,657,837, U.S. Pat. No. 5,153,301.

It is also possible to use a blend of addition polymers and polycondensation polymers in the preparation of toner particles according to the present invention as disclosed e.g. in U.S. Pat. No. 4,271,249.

In order to modify or improve the triboelectric chargeability in either negative or positive direction the toner particles may contain (a) charge control agent(s).

The toner powder particles useful in a method according to the present invention may be prepared by mixing the above defined binder resin(s) and ingredients (,e.g. a pigment or dye, an inorganic filler, a charge controlling agent,) in the melt phase, e.g. using a kneader. The kneaded mass has preferably a temperature in the range of 90 to 140° C., and more preferably in the range of 105 to 120° C. After cooling, the solidified mass is crushed, e.g. in a hammer mill and the obtained coarse particles further broken e.g. by a jet mill to obtain sufficiently small particles from which a desired fraction can be separated by sieving, wind classification, cyclone separation or other classifying techniques.

The toner particles useful according to the present invention may also be prepared by a "polymer suspension" process. In this process the toner resin (polymer) is dissolved in a water immiscible solvent with low boiling point and the toner ingredients (e.g.az pigment or dye, an inorganic filler, a charge controlling agent, etc.) are dispersed in that solution. The resulting solution/dispersion is dispersed/suspended in an aqueous medium that contains a stabiliser. The organic solvent is evaporated and the resulting particles are dried. The evaporation of the solvent can proceed by increasing temperature, by vacuum evaporation, by spray-drying as described in, e.g. U.S. Pat. No. 3,166,510, U.S. Pat. No. 3,338,991, electrostatic pulverising as described in, e.g. GB-A-2,121,203, etc.

The toner particles can comprise any pigment or dye (further on pigment is used to designate dyes as well as pigments) known in the art. When the method is used for printing mono-chrome black image the pigment is preferably carbon black. For preparing toner particles with other colours a list of suitable dyes or pigments are disclosed in e.g. EP-A-601 235, that is included herein by reference.

The powder toner particles useful according to the present invention may be used as mono-component developer (magnetic as well as non-magnetic), i.e. in the absence of carrier particles as well as in a two-component system comprising carrier particles.

When the method according to this invention is implemented with magnetographic printing stations, the toner particles will also comprise magnetic pigments.

When used in admixture with carrier particles, 2 to 10% by weight of toner particles is present in the whole developer composition. Proper mixing with the carrier particles may be obtained in a tumble mixer.

Toner particles useful in this invention can have an average volume diameter ($d_{v50}$) between 3 and 20 $\mu$m, preferably between 5 and 15 $\mu$m and more preferably between 5 and 7 $\mu$m. The particle size distribution of said toner particles can be of any type. It is however preferred to have an essentially (some negative or positive skewness can be tolerated, although a positive skewness, giving less smaller particles than an unskewed distribution, is preferred)

Gaussian or normal particle size distribution, either by number or volume, with a coefficient of variability (standard deviation divided by the average) (v) smaller than 0.5, more preferably of 0.3.

Suitable carrier particles for use in cascade or magnetic brush development are described e.g. in GB-B 1,438,110. For magnetic brush development the carrier particles may be on the basis of ferromagnetic material e.g. steel, nickel, iron beads, ferrites and the like or mixtures thereof. The ferromagnetic particles may be coated with a resinous envelope or are present in a resin binder mass as described e.g. in U.S. Pat. No. 4,600,675. The average particle size of the carrier particles is preferably in the range of 20 to 300 $\mu$m and more preferably in the range of 30 to 100 $\mu$m.

In a particularly interesting embodiment iron carrier beads of a diameter in the range of 50 to 200 $\mu$m coated with a thin skin of iron oxide are used. Carrier particles with spherical shape can be prepared according to a process described in GB-A-1,174,571. Carrier beads comprising a core and coated with a Si-containing resin are preferred for use according to the present invention. Such carrier beads have been described in e.g. U.S. Pat. No. 4,977,054; U.S. Pat. No. 4,927,728 and EP-A 650 099.

What is claimed is:

1. A method for printing a reproduction of an image by using toner particles, comprising the steps of:
    (a) obtaining digital image data of at least two density separations of the image forming at least two sub-images;
    (b) providing image data of a first sub-image of the sub-images to a printing station containing first toner particles with a particular chromaticity and a particular optical density;
    (c) image-wise applying the toner particles on an image receiving member for forming a first toner image in correspondence with the image data of the first sub-image; and
    (d) repeating, on the same printing station and using further toner particles having a chromaticity substantially equal to the particular chromaticity and an optical density substantially equal to the particular optical density, steps (b) and (c) at least once more for bringing at least one further toner image, corresponding to a further sub-image, on the image receiving member in register with the first toner image.

2. A method according to claim 1, wherein the toner particles are the same as the further toner particles.

3. A method according to claim 1, wherein the printing station is an electrostatic printing station.

4. A method according to claim 1, wherein the station is a device for direct electrostatic printing.

5. A method according to claim 2, wherein the printing station is an electrophotographic printing station.

6. A method according to claim 2, wherein the printing station is a device for direct electrostatic printing.

7. A method according to claim 3, wherein the printing station is coupled to an intermediate image receiving member.

8. A method according to claim 4, wherein the printing station is coupled to an intermediate image receiving member.

9. A method according to claim 1, wherein the first printing station is an magnetographic printing station.

10. A method according to claim 2, wherein the first printing station is an magnetographic printing station.

11. A method according to claim 1, wherein the toner particles are dry toner particles.

12. A method according to claim 2, wherein the toner particles are dry toner particles.

13. A method according to claim 11, wherein the toner particles comprise a toner resin and a pigment so that when 0.5 mg/cm2 of the toner particles are deposited on a reflecting substrate, an optical reflection density between 0.1 and 1.00 is obtained.

14. A method according to claim 12, wherein the toner particles comprise a toner resin and a pigment so that when 0.5 mg/cm2 of the toner particles are deposited on a reflecting substrate, an optical reflection density between 0.1 and 1.00 is obtained.

15. A method according to claim 1, wherein the reproduction is a reproduction of a diagnostic image.

16. A method according to claim 2, wherein the reproduction is reproduction of a diagnostic image.

17. A method according to claim 13, wherein the reproduction is a reproduction of a diagnostic image.

18. A method according to claim 14, wherein the reproduction is a reproduction of a diagnostic image.

19. A device for printing a reproduction of an image by using toner particles, comprising:
    an arrangement which:
        i. obtains digital image data of at least two density separations of the image forming at least two sub-images,
        ii. provides image data of a first sub-image of the sub-images to a printing station containing first toner particles with a particular chromaticity and a particular optical density,
        iii. image-wise applies the toner particles on an image receiving member for forming a first toner image in correspondence with the image data of the sub-image, and
        iv. repeats, on the same printing station and using further toner particles having a chromaticity substantially equal to the particular chromaticity and an optical density substantially equal to the particular optical density, procedures ii. and iii. at least once more for bringing at least one further toner image, corresponding to a further sub-image, on the image receiving member in register with the toner image.

20. A method according to claim 1, wherein one of the sub-images is provided over another one of the sub-images.

21. A device according to claim 19, wherein one of the sub-images is provided over another one of the sub-images.

22. A device according to claim 19, wherein the toner particles are the same as the further toner particles.

* * * * *